Patented June 24, 1930

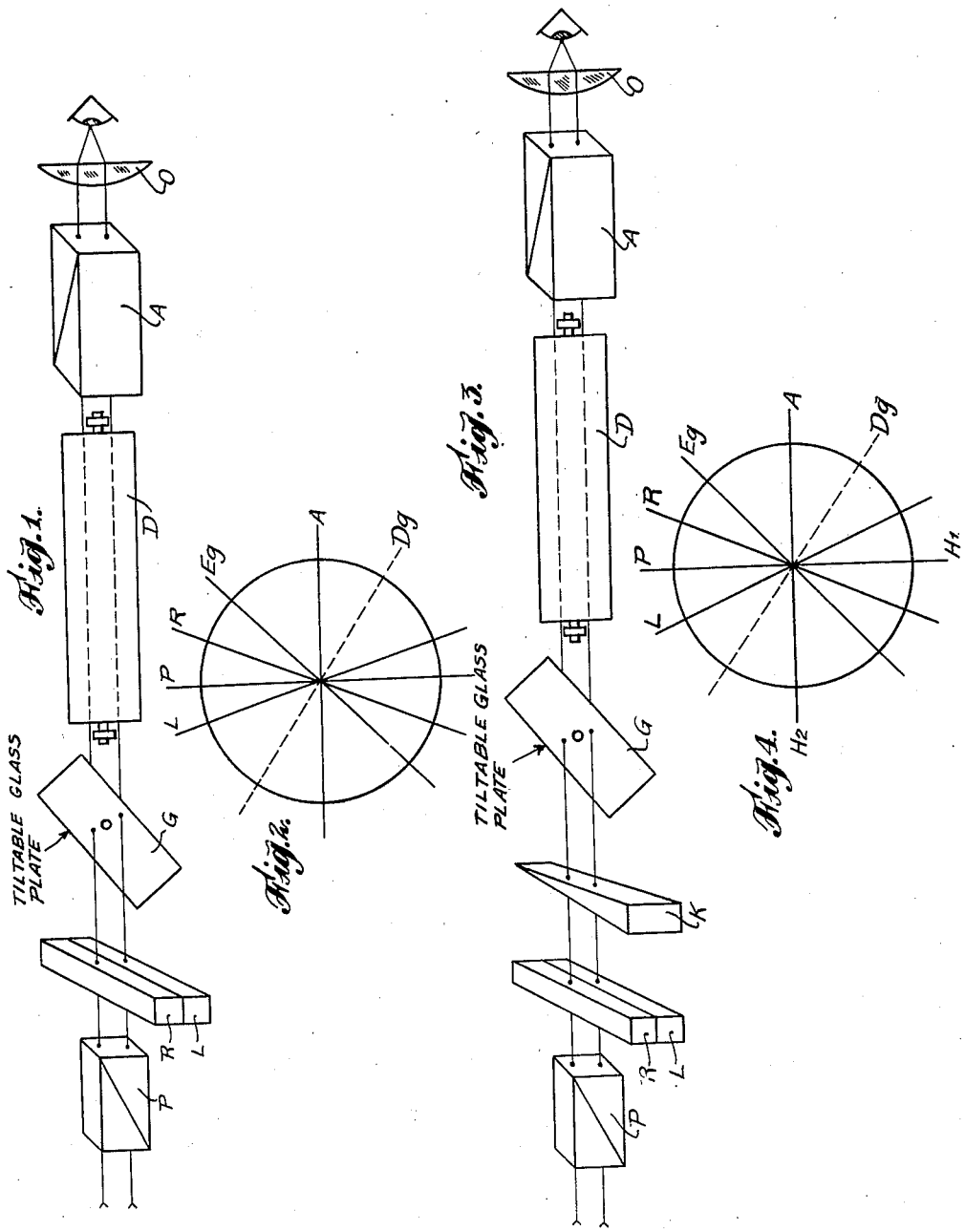

1,767,831

UNITED STATES PATENT OFFICE

MAX BEREK, OF WETZLAR, GERMANY, ASSIGNOR TO ERNST LEITZ, OPTISCHE WERKE, OF WETZLAR, GERMANY, A FIRM

POLARIMETRIC APPARATUS

Application filed April 21, 1927. Serial No. 185,506.

The present invention relates to improvements in polarimetric apparatus, particularly apparatus of this character using any of the commonly known penumbra or half-shade elements, well known in the art, and it is the principal object of my invention to make use with such an apparatus of one or a plurality of inclinable or tiltable glass plates for the compensation of the optical rotation, namely, the rotation of the plane of polarization of a substance.

Another object of my invention is the provision of an apparatus of this character in which the half-shade elements are combined with a quartz-wedge member or element, cut parallel to its optical axis, one of the planes of polarization of which divides the half-shade angle in half.

These and other objects and advantages of my invention will become more fully apparent as the description thereof proceeds, and will then be specifically defined in the appended claim.

As briefly stated above, it is the object of the present invention to provide an essentially simpler device or apparatus for the compensation of the rotations to be measured without the use of analyzer scales or circles.

In the accompanying drawings, forming a material part of this disclosure:

Figures 1 and 2 show diagrammatically the construction of my apparatus in half-shade apparatus, and Figures 3 and 4 the same with the use of a quartz-wedge.

In Figure 1 of the drawings showing the preferred embodiment of my invention, P designates a polarizer, RL a penumbra or half-shade plate or a half-shade wedge rotating the planes of polarization in different directions, G is a rotatable glass-plate which according to the results obtained by the various measuring operations will assume a different angle to the longitudinal axis of the polarimeter, and, angles of 45° and 135° are the limits for its rotation to the left or right, and may be verified by inspection of Figure 2 in which D$g$. indicates the axis of rotation of glass plate G, and E$g$ the plane of incidence, D a rotating body containing a substance, A an analyzer, and O a lens or magnifying glass.

The preferred embodiment of my invention operates as follows:

Assuming that the half shade angle RL is halved by P, as illustrated in Figure 2, then the glass-plate in both halves of the field of vision will compensate the optical rotation i. e. the plane of polarization of a substance to be measured.

Figure 2 illustrates diagrammatically the directions of polarization pertaining to Figure 1, P indicates that of the polarizer, R and L after the emersion of the light from the half-shade plate, A of the analyzer, E$g$. is the plane of incidence on the glass-plate, and D$g$. the axis of rotation at the glass-plate.

Figure 3 shows diagrammatically a view similar to Figure 1 differing therefrom by the introduction of a quartz-wedge K between the penumbra RL and the glass-plate G, parallel to the optical axis of the wedge with the wedge edge on the dividing line of RL.

Figure 4 illustrates the directions of polarization pertaining to Figure 3, parallel are: one of the polarizing planes H1 parallel within the wedge to P, the other plane H2 parallel to A, so that the half-shade angle RL is divided in half by H1.

It will be understood that while I have shown and described as examples some of the many ways to practically execute my invention I do not desire to limit myself to the exact features disclosed, but reserve my right to any such changes in the general arrangement and specific construction disclosed as come within the scope of the appended claim without departure from the spirit of my invention and the principles involved.

Having thus described my invention, what I claim as new, and desire to secure by Letters Patent is:

In polarimetric apparatus, a lens, a rotatable body containing a substance to be analyzed, an analyzer between said lens and body, a polarizer, a half-shade wedge in front of the same, and a tiltable glass plate between said half-shade wedge and said glass plate.

Signed at Frankfort-on-the-Main, Germany, this 26th day of March A. D. 1927.

MAX BEREK.